United States Patent [19]

Abel et al.

[11] Patent Number: 4,841,276

[45] Date of Patent: Jun. 20, 1989

[54] VEHICLE LOW SPEED WARNING SYSTEM

[75] Inventors: Roy P. Abel, 1315 N. Columbus #13, Glendale, Calif. 91202; Warren W. Welcome, Tarzana, Calif.

[73] Assignee: Roy P. Abel, Glendale, Calif.

[21] Appl. No.: 119,298

[22] Filed: Nov. 6, 1987

Related U.S. Application Data

[63] Continuation-in-part of Ser. No. 745,194, Jun. 17, 1985, Continuation of Ser. No. 741,815, Jun. 6, 1985.

[51] Int. Cl.[4] ............................................. B60Q 1/00
[52] U.S. Cl. .................................... 340/466; 340/467; 307/10.8
[58] Field of Search ....................... 340/70, 71, 74, 98, 340/100, 62; 324/166, 175; 307/10 LS

[56] References Cited

U.S. PATENT DOCUMENTS

| | | | | |
|---|---|---|---|---|
| 3,037,188 | 5/1962 | Weigl | ..................................... | 340/70 |
| 3,790,932 | 2/1974 | Ridpath | ............................. | 340/71 X |
| 3,911,394 | 10/1975 | Shames | ................................... | 340/71 |
| 4,162,445 | 7/1979 | Campbell | ............................. | 324/175 |
| 4,395,624 | 7/1983 | Wartski | ............................ | 324/166 X |

*Primary Examiner*—Joseph A. Orsino
*Assistant Examiner*—Jeffery A. Hofsass
*Attorney, Agent, or Firm*—Frank L. Zugelter

[57] ABSTRACT

An electronic vehicle slow-speed warning system operable automatically to activate the vehicle stop or brake lights if the operator neglects to do so while the vehicle is moving forwardly below a predetermined speed. Both the vehicle backup and stop lights are activated during backward travel at any speed. The warning system is designed for installation in conventional motor vehicles and is constructed entirely of solid state components free of moving parts. The system is selectively operable with either a frequency or optical speed signal sensor and with or without a micro processor.

6 Claims, 4 Drawing Sheets

PULSE INTERVAL DETECTOR
FOR
VEHICLE LOW SPEED WARNING SYSTEM.

PULSE INTERVAL DETECTOR
FOR
VEHICLE LOW SPEED WARNING SYSTEM.

TIMING DIAGRAM FOR PULSE INTERVAL DETECTOR.

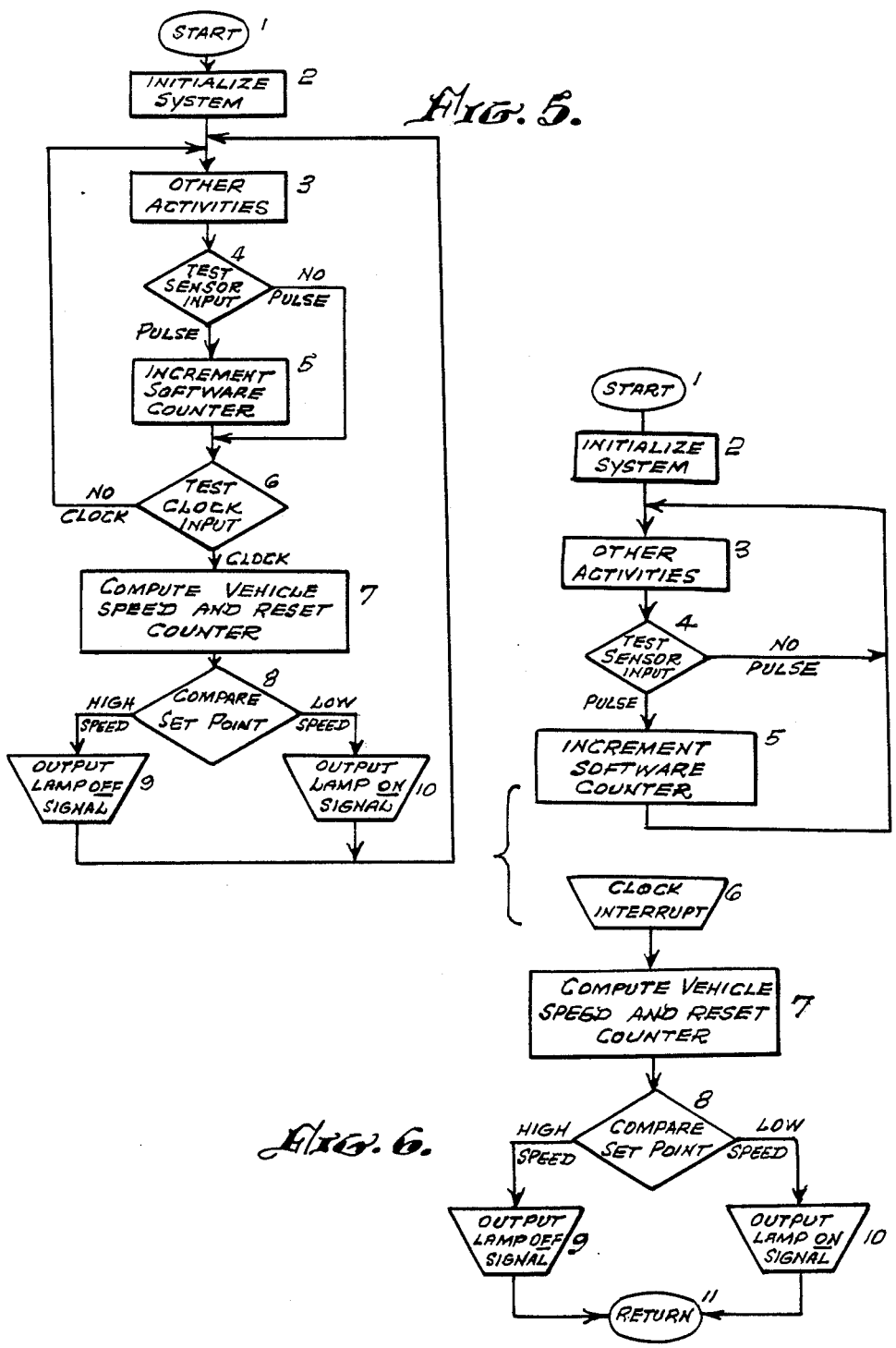

VEHICLE LOW SPEED WARNING SYSTEM

This is a continuation-in-part of my prior application, Ser. No. 745,194, now abandoned filed June 17, 1985 for a Vehicle Low Speed Warning System, said prior application being a continuation application of Ser. No. 06/741,815, now abandoned filed June 6, 1985, and the present specification, in addition to the parent application, includes a new and improved pulse interval detector and microprocessor control for use with and in the apparatus of my prior application.

This invention relates to motor vehicle warning systems, and more particularly to a unique electronic device automatically operable to activate the vehicle stop lights if the operator neglects to do so during operation at a predetermined slow speed. The new warning device includes means for activating both the stop lights and the backup lights whenever the vehicle is traveling backwardly.

BACKGROUND OF THE INVENTION

Conventional motor vehicles are provided with manually controlled tail and headlights, and automatic backup (white) lights and stop (red) lights which are activated whenever the foot brake is being applied. However, there are numerous occasions and conditions when the stop lights are not activated, particularly during the final stages of deceleration, as for example, during stationary or slowly moving traffic. Drivers of clutch-equipped transmissions sometimes declutch without braking with the result that the stop lights are not activated. Also on moderately steep hills, with automatic transmission vehicles, some drivers tend to "play" the accelerator or, if the vehicles have manual transmissions, to "slip" the clutch while depressing the accelerator to avoid rolling backwards. Other drivers utilize engine compression for braking or a shift downward, with either manual or automatic transmissions. Additionally, conventional leading vehicles lack means for automatically warning drivers-to-the-rear when it is traveling at slow speed and under conditions (egs.: dusk, inclement weather, poor visibility) where sudden stopping is a distinct possibility.

Proposals have been made heretofore to provide vehicles with warning expedients, but these are subject to numerous shortcomings and disadvantages sought to be obviated by this invention. In general, prior proposals involve moving components subject to malfunctioning, or necessitating substantial additions to or modification of portions of a conventional motor vehicle, or which are otherwise subject to undesirable limitations or shortcomings. For example, in U.S. Pats. Nos., Mitchell (2,486,864) proposes a slow travel blinker coriza (2,566,544) proposes a brake-operated slow signal indicator; Petrella et al (2,750,578), Dawg (2,957,161), Combs (3,109,158), and Carlson (4,320,384), each show a slow travel warning system under the control of a vehicle accelerator pedal. Warren et al (2,764,962) proposes a vacuum-operated slow travel indicator. Rapp (2,832,864) discloses a ball governor-operated warning system off of a spedometer cable, and Nordlund (2,974,304) proposes a complex pulse-echo sonic-sensitive warning system.

SUMMARY OF THE INVENTION

This invention provides a low speed warning system installable on conventional motor vehicles without need for any alteration of the manufacturer's equipment other than electrical connections for input and output signals and connections to ground and to the vehicle battery. My greatly simplified, unique warning system is formed entirely of solid state components without moving parts. It has an input terminal connectible to the vehicle speed sensor (for example, a speedometer cable), a grounding terminal, a power input terminal connectible to the vehicle battery and signal output terminals connectible to the vehicle stop lights and backup light. If the vehicle is equipped with a conventional microprocessor, there is an additional pair of terminals connectible to that processor. The vehicle speed input signal is processed to provide a variable potential output signal indicative of vehicle speed. This variable voltage output signal is fed to a signal comparator for comparing the vehicle speed signal potential with a threshold potential preselected to represent a predetermined vehicle slowdown speed. If the input to the comparator is below this predetermined threshold signal, the comparator provides an output which is fed to an electronic driver connected to circuit with the vehicle power supply and the vehicle stop and backup lights. So long as the vehicle is traveling at or below the predetermined slow speed in a forward direction, the stop (red) lights remain energized irrespective of the position of the brake pedal but only so long as the vehicle is moving forwardly at or below the preselected slow speed. If the vehicle is in reverse, this invention warning system functions to maintain not only the vehicle stop lights, but also energizes the backup lights, with both sets of lights functioning at all reverse travel speeds.

Accordingly, the primary object of this invention is to provide a unique, improved vehicle warning system for assuring that the vehicle stop lights remain energized so long as the vehicle is moving below a predetermined speed.

Another object of the invention is the provision of a solid state accessory, readily installable as a unit in a conventional motor vehicle, and operable to automatically warn rearward vehicles of the deceleration of the leading vehicle irrespective of whether the vehicle brakes are being applied.

Another object of the invention is the provision of an electronic solid state accessory for installation in a motor vehicle in parallel with the vehicle's speed sensor and the brake-operated stop lights and having automatic provision for assuring energization of the stop lights so long as the vehicle is traveling forwardly at or below a predetermined slow speed.

Another object of the invention is the provision of a simple, inexpensive solid state necessary for a motor vehicle connectible in parallel between the vehicle speed sensor and the vehicle stop and backup or reverse lights and automatically operable to energize the stop lights and the reverse lights while the vehicle is traveling rearwardly at any speed and for automatically energizing the vehicle stop lights so long as the vehicle is traveling forwardly below a predetermined slow speed.

Another object of this invention is to provide a novel, unique warning system operable for any road or pavement inclination for the vehicle to which the system is connected.

A further object of the invention is to inexpensively produce rugged high volume copies of the subject matter of the invention through utilization of reliable and known solid state electronic technology, each readily adaptable to many types of vehicles via jumper arrangements.

Other objects of the invention are: to provide a deterrent to a rear end collision, to provide a caution signal in slow moving traffic, and to provide a signal that a vehicle (equipped with this invention) is moving.

These and other more specific objects will appear upon a reading of the following specification, the claims appended thereto and the accompanying drawing.

DESCRIPTION OF THE DRAWING

Referring now to the drawing:

FIG. 6 illustrates an alternate flow-chart for the system of FIG. 4.

FIG. 8 is another such flow chart for FIG. 4's system.

DESCRIPTION OF THE BEST MODE OF THE INVENTION

Figure 1:
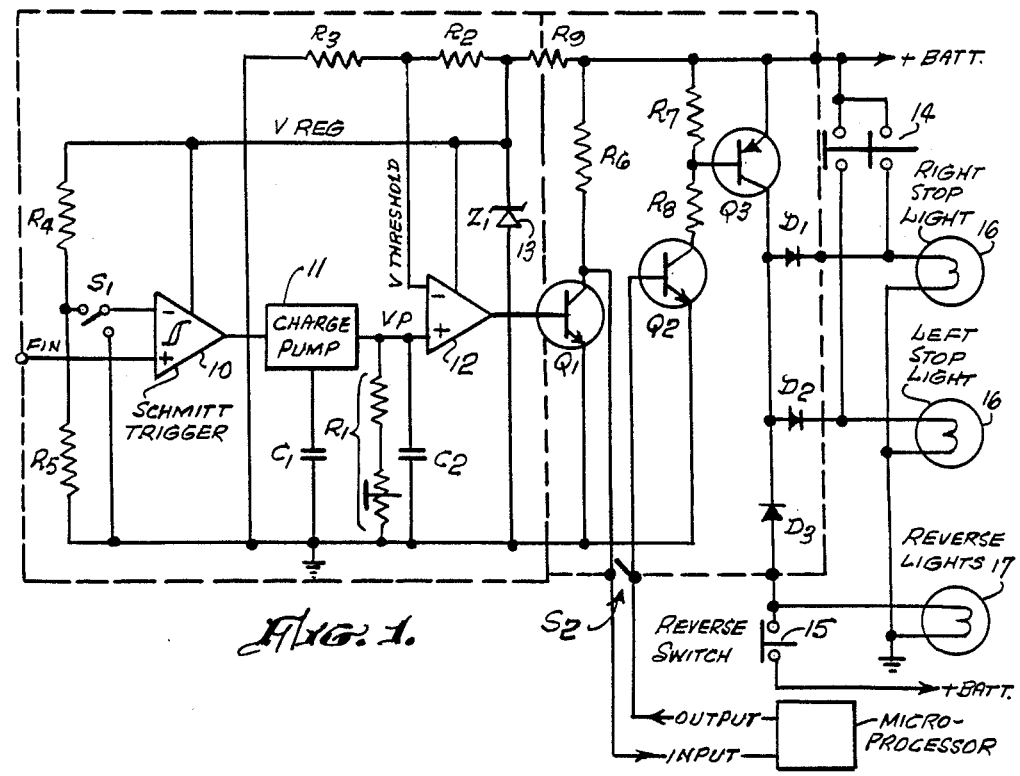
FIG. 1 is a schematic view of my unique vehicle low speed warning system having its output terminals connected to the vehicle stop and backup lights.

Referring now to the drawing, it is pointed out that the vehicle speed input signal $F_{in}$, FIG. 1, is supplied to the positive input of a Schmitt trigger 110 from either a variable reluctance speed sensor of a conventional motor vehicle or from an optical speed sensor inserted into the circuit in lieu of resistor $R_4$. For example, trigger 110 is connected either to an existing speed tachometer or to an optional variable reluctance transducer for those vehicles without a tachometer, in known manner. Existing speed sensors on modern cars can generate the required tachometer pulses constituting the input signal $F_{in}$ to the Schmitt trigger 110. This input may be ground referenced for use with variable reluctance pickups, or may be a preset reference for use with optical tachometers. If the invention warning device is constructed for installation in a vehicle equipped with one or the other type of such sensors, the circuit is provided with a switch $S_1$ selectively operable to utilize either a variable reluctance or an optical speed sensor. The latter is supplied with a regulated voltage "V Reg" from the positive side of the vehicle battery by way of a resistor $R_9$ and functions in known manner to convert the variable input frequency signal $F_{in}$ into square wave pulse signals which are supplied to a conventional charge pump 11 connected in circuit as shown with a load represented by resistor $R_1$. Charge pump 11 converts the output pulses from Schmitt trigger 110 into a DC voltage which is proportional to vehicle speed as trigger 110 changes state with each pulse. $C_1$ is a timing capacitor which is either charged or discharged linearly between two reference voltages whose difference is equal to half the regulated supply voltage V Reg. In a time period equal to one half the input frequency $F_{in}$, the change in the charge on $C_1$ is represented by the equation:

$$\frac{\Delta Q}{T} = I_{avg} = \frac{V \, Reg}{2} C_1 (2 F_{in}) \quad (a)$$

The output circuit of charge pump 11 introduces the low current very accurately into the load resistor $R_1$ one side of which is connected to ground as shown. The current flow provided by the output pulses of the charge pump is integrated by capacitor $C_2$ and this operation is expressed by the following equations:

(b) $VP = I_c \times R_1$ (c) $VP = V \, \text{reg} \times F_{in} \times C_1 \times R_1 \times K,$ where K is the gain factor and typically equals 1.

The capacitance of $C_1$ is selected to be greater than 100 pf to eliminate error current in $R_1$ at low temperatures and to assure accurate operation under a wide range of temperature conditions. The ratio of the charge pump output VP to $R_1$ is chosen to be less than the fixed output current of the output of charge pump 11, thereby insuring that this ratio does not become a significant fraction of the output impedance.

The peak-to-peak ripple content is represented by the following equation:

$$V \, \text{ripple} = \frac{V \, Reg}{2} \left[ 1 - \frac{V \, Reg \times F_{in} \times C_1}{I_2} \right] \frac{C_1}{C_2}, \quad (d)$$

where $I_2$ is a fixed charging current (200 microamps being typical).

Capacitor $C_2$ controls the response time, and the maximum input frequency is represented by the following equation:

$$F_{in} \, \text{max} = \frac{I_2}{C_1 \times V \, Reg}. \quad (e)$$

The charge pump output signal VP is delivered to a comparator chip 112 of well-known construction along with a voltage input from the vehicle battery supplied by way of resistors $R_2$ and $R_9$ and which voltage input represents the threshold speed at or below which it is desired to provide an output signal for processing to assure activation of the vehicle stop lights 16, 17 and the warning system is operated with $S_1$ closed horizontally. This speed threshold voltage is derived from $R_2$ and $R_3$.

If the vehicle is to be operated with an optical speed sensor instead of with a variable reluctance sensor, the input is applied to the same input terminal of Schmitt trigger 110, and switch $S_1$ is closed vertically. In such a case, the sensor-level threshold voltage (not the speed threshold voltage) is zero.

When switch $S_1$ is closed horizontally, the speed threshold voltage is established by the following expression:

$$V \, \text{Threshold} = \frac{R_5 \times V \, Reg}{R_4 + R_5}. \quad (f)$$

As appears from the schematic, the regulated voltage V Reg is supplied to the comparator and is clamped at a suitable voltage substantially below the battery voltage. If the battery voltage is 12 volts, as it typically is, then the regulated voltage V Reg is controlled by $R_9$ and is stabilized at a value of, say, 6 to 7 volts by a Zener diode 13.

The comparator output is connected to an output driver formed of transistors $Q_1$, $Q_2$, $Q_3$ and resistors $R_6$, $R_7$, and $R_8$, and switch $S_2$ which is closed if the vehicle is not equipped with a microprocessor. When the input to the base of transistor $Q_1$ is at a value representing a predetermined vehicle speed represented by the preselected threshold voltage, the three driver transistors provide an output which is delivered to the vehicle stop lights 16, 17 via diodes $D_1$ and $D_2$ to activate these stop lights, warning drivers to the rear that the vehicle is in an imminent stop condition, provided these stop lights are not already activated by the brakeoperated stop light switch 14. So long as the vehicle speed remains above the predetermined threshold speed, the output of the comparator saturates transistor $Q_1$ and removes the base drive current from $Q_2$ so that $Q_2$ turns off. This causes the base drive to the output stage transistor $Q_3$ to be removed with the result that the stop lights can be activated only if the operator applies the brakes to close the brake switch 14. It is to be understood that if the vehicle is not equipped with a microprocessor, transistors $Q_1$ and $Q_2$ are connected to one another by a jumper or a switch $S_2$.

Many late model vehicles are equipped with a microprocessor that, inter alia, can produce a signal in response to the speed of the vehicle. If the vehicle is equipped with such a microprocessor, then the microprocessor's control circuit is connected across the contacts of switch $S_2$, and $S_2$ switched to its open position.

Diode $D_3$ as shown in the circuit prevents energizing or activating reverse lights 17 at any time during a forward movement or a stop for the vehicle. During reverse movement of the vehicle, the system illustrated in FIGURE 1 functions essentially in the same manner described above with the result that so long as the vehicle is moving in a reverse direction, the reverse switch 15 will be closed to maintain the vehicle backup lights 17 energized. Additionally and so long as the vehicle is moving backwardly at any speed, the stop lights 16 also will be energized since the stop lights 16 are connected in parallel with reverse lights 17, all of which then are controlled by the vehicle reverse switch 15.

Schmitt trigger 110, charge pump 11 and comparator chip 12 are available as a converter manufactured as #LM2907, by National Semiconductor Corporation, 2900 Semiconductor Drive, Santa Clara, Calif. 95051. It should be understood that the Schmitt trigger 110 is a very specific type of circuit, and that the invention comprehends as well general shaping circuits or signal conditioners, with hysteresis.

The equations set out above all are available with explanations, descriptions and applications on and between pages 9–79 and 9–84 of the publication *Linear Data Book*, 1980 edition, published by National Semiconductor Corporation.

It should be apparent now that any rotating member of a vehicle traveling on the rod at a speed, such as, for example, wheel, axle, drive shaft, spedometer cable, differential and transferential (for frontwheel drives) gears, constitutes a source of or for electrical pulses, as distinguished from the speed of the engine, and occurring at a time rate proportional to the vehicle's speed.

Figure 2:
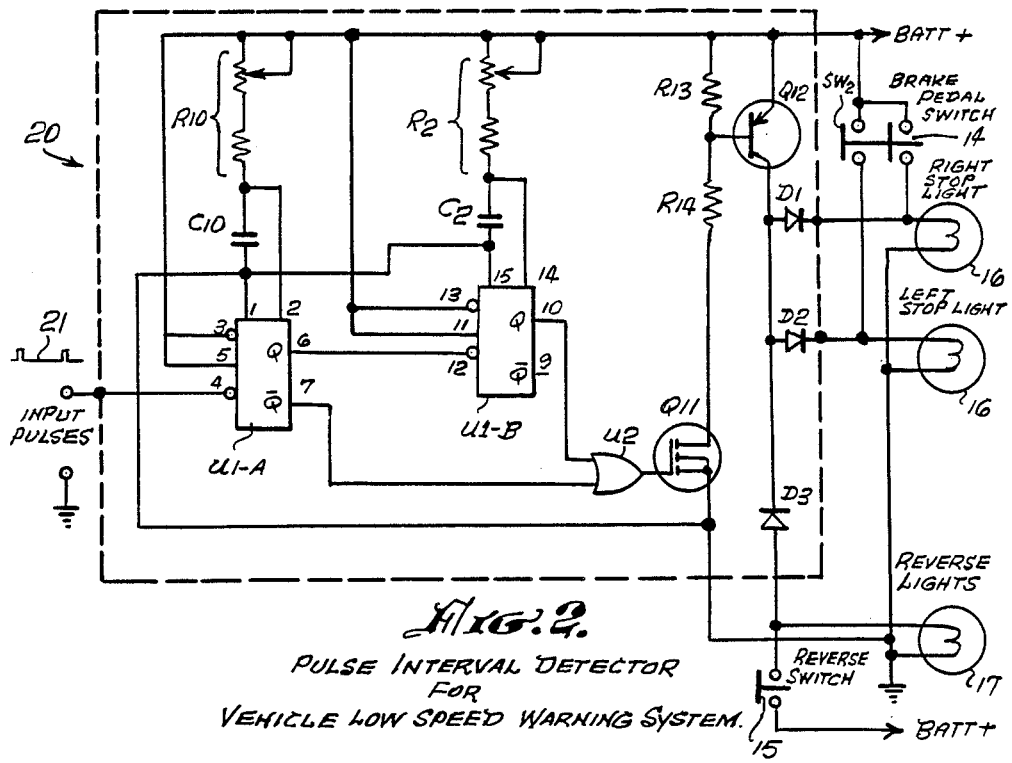
FIG. 2 is a schematic diagram of a embodiment of the invention in which the input comprises pulses from a speed-sensing transducer.

Referring to FIG. 2, there is shown a preferred embodiment of the invention, comprising a pulse interval detector 20 and its ancillary light control circuits. Input pulses 21 from a source similar to that described in connection with the previously-described embodiment shown in FIG. 1, and which pulses are generated at a rate directly proportional to the speed of the vehicle, are applied across input terminal 4 and ground terminal 5 of an integrated circuit. The integrated circuit comprises a pair of independent monostable multivibrators or "one-shot" trigger circuits, U1-A and U1-B. Each one-shot trigger circuit employs a Schmitt trigger at its input terminal, thereby reliably responding to input pulses having slow rise times. This integrated circuit is a well-known standard product, identified in the industry as a type number 4538, and uses the well-known CMOS technology. The advantages of the CMOS technology, as utilized herein, are low power consumption, operation from a wide range of supply voltages, and high immunity to electrical noise, which environment is typical of that found in an automotive vehicle.

Terminals 1 (ground) and 2 of the one monostable multivibrator U1-A are connected to an external resistor R10 and capacitor C10, as shown in FIG. 2, to form a timing circuit. A series variable resistor comprises a portion of R10 and permits an adjustment of the timing period. The timing interval of U1-A is nominally equal to the product of C10 and R10, and is trimmed by the variable portion of resistor R10. The timing circuit is also connected to the positive terminal of the power source, identified as BATT+.

When triggered by an incoming pulse on terminal 4, the output terminals 6 and 7 of one-shot U1-A will change state (become "set"), pin 6 going high and pin 7 going low, for a predetermined interval of time, as controlled by the timing network comprising R10 and C10, after which U1-A will revert back to its original (reset) state, without the necessity of a further input pulse. Thus, this portion of the circuit is "retriggerable" in that a new timing interval started with each incoming trigger pulse, whether or not the interval started by the previous trigger pulse has been completed. Thus, the one-shot U1-A will remain in its "set" state for as long as the periods between leading edges of successive trigger pulses are shorter than its predetermined timing interval.

The primary function of the novel pulse interval detector circuit 20 of the invention is to detect when the pulse rate of the train of incoming pulses, which are proportional to the speed of the vehicle, drops below the predetermined minimum rate, and thereby generate a control signal that can be used to turn on the vehicle's stop/brake lights for as long as the rate remains below that minimum rate. Detection of that pre-set minimum speed is accomplished by continuously comparing the pre-set timing interval of the one-shot U1-A with the period between leading edges of the successive incoming pulses externally supplied to the detector circuit.

The output of one-shot U1-A is obtained from pins 6 and 7 thereof, and when U1-A is "reset", the output at pin 6 will be low, and the complementary output at pin 7 will be high. The output from pin 7 is supplied to one input of OR gate U2, and the other input of OR gate U2 is derived from the output of the second one-shot multivibrator U1-B. The output of OR gate U2 is supplied to the gate electrode of enhanced mode field effect transistor Q11. The output of transistor Q11 is used to drive power transistor Q12 via resistor R14. The base of transistor Q12 is provided with bias potential via resistor R13. The emitter of transistor Q12 is provided with operating potential from power supply BATT+.

A "high" output at pin 7 of U1-A will provide an ON control signal to transistor Q11, via OR gate U2, and thereby drive transistor Q12 into conduction. This in turn will provide power to turn on right-brake light 16 and left brake light 17, via checking diodes D1 and D2, respectively, independently of brake pedal switch 14. When the output signal from OR gate U2 is low, transistor Q11 will be off except for a small leakage current, and the brake lights 16, 17 will not be energized.

As can be seen, power can be supplied independently to brake lights 16 and 17, via brake pedal switch SW2.

The ON condition of transistor Q12 holds continuously while the vehicle in not in motion (since the input pulse rate remains below the minimum value), but a very slow rate of speed causes the signal on pin 7 to be alternately high and low. In the absence of other controls, this would result in the signal at pin 7 of U1-A to alternately cycle between high and low, and thereby cause the brake lights 16 and 17 to blink ON and OFF. This is overcome by means of the second one-shot U1-B. On the other hand, it may be noted that by eliminating U1B, its timing circuit comprising R2 and C2, gate U2, and pin 7 with its line to gate U2, while connecting pin 6 to transistor Q11, the blinking effect will remain. However, with U1-B in the circuitry, the output pin 6 of U1-A is tied to the input trigger pin 12 of U1-B so that U1-B is triggered by U1-A at the start of the timing interval. In this way, U1-B provides a signal through its output pin 10 to the alternate input of OR gate U2, and through to the light driver circuits comprising Q11 and Q12.

The alternate input to the OR gate functions to hold the brake lights ON until U1-A can again take over this function at the end of its timing interval. The timing of U1-B is not critical, just so it is longer than that of U1-A.

One-shot U1-A can trigger one-shot U1-B only when U1-A changes state, and when the input pulse rate is above the predetermined value, one-shot U1-A remains continuously "set", thereby depriving U1-B of input trigger signals. Under this condition, neither one-shot provides an ON signal to the light drivers, and the brake lights remain off.

Checking diode D3 passes current whenever the reverse switch 15 is ON so that the brake lights 16 and 17 are lighted, in addition to the reverse (back up) lights 17, whenever the vehicle is in reverse gear, regardless of vehicular speed.

Figure 3:
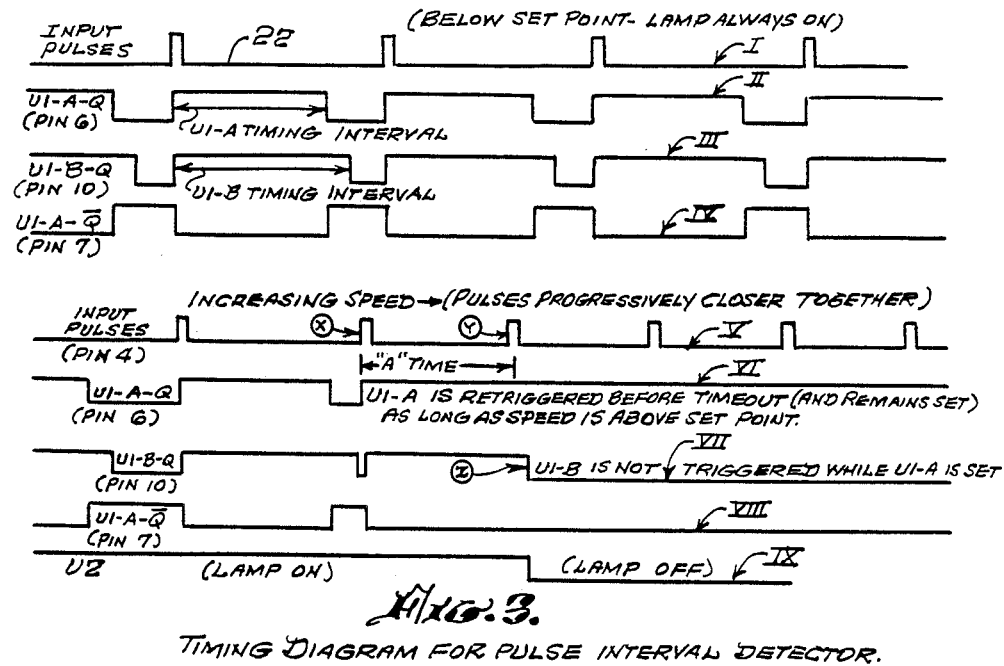
FIG. 3 is a timing diagram of the pulse interval detector shown in FIG. 2.

The functional operation of the pulse interval detector and control circuit can be seen more clearly by reference to the timing diagrams of FIG. 3. As shown therein, the upper group of waveforms, identified as I through IV, depict the condition of a steady vehicular speed below the predetermined value. Waveform I shows the input pulses 22 (steady speed) occurring at regular intervals proportional to the speed of the vehicle. Waveform II depicts the output of U1-A, pin 6, showing the timing interval as the positive portion. Waveform III represents the output at pin 10 of U1-B, showing that it is triggered virtually at the same time as U1-A (actually a few nanoseconds later), but has a longer time interval than U1-A. Waveform IV is the complementary output appearing at pin 7 of U1-A. The output of OR gate U2, which controls the lights via the power driver circuit, is the logical OR function of waveforms III and IV. Note that for the condition of steady vehicular speed above the predetermined value, the input pulses of waveform I will be closer together, but waveforms II through IV will all be straight lines, since they do not change state.

The lower group of waveforms, comprising waveforms V through IX, depicts the condition wherein vehicular speed is increasing and passing through the predetermined value. Waveform V shows the input pulses getting closer together with the passage of time. Waveform VI shows the output of U1-A resembling waveform II while the input pulse period is longer than its timing interval, but degenerating to a straight line when it is retriggered at point "Y" before completion of its interval.

Waveform VII illustrates the output of U1-B, pin 10, showing that it is triggered on the last transition of U1-A at point X, and remains reset after completion of this final timing interval at point Z. Waveform VIII is the complement of waveform VI, but the light control signal is the logical OR function of waveforms VII and VIII. The output of OR gate U2 is shown in waveform IX. The lights do not turn off until the completion of the U1-B timing interval at point Z. Note, however, that this does not constitute a long delay in light turn-off, since the higher speed was not actually detected until the arrival of the input pulse at point Y.

From the foregoing it will be seen that the novel and improved pulse interval detector of the present invention satisfies all of the aforementioned objects of the invention.

Figure 4:
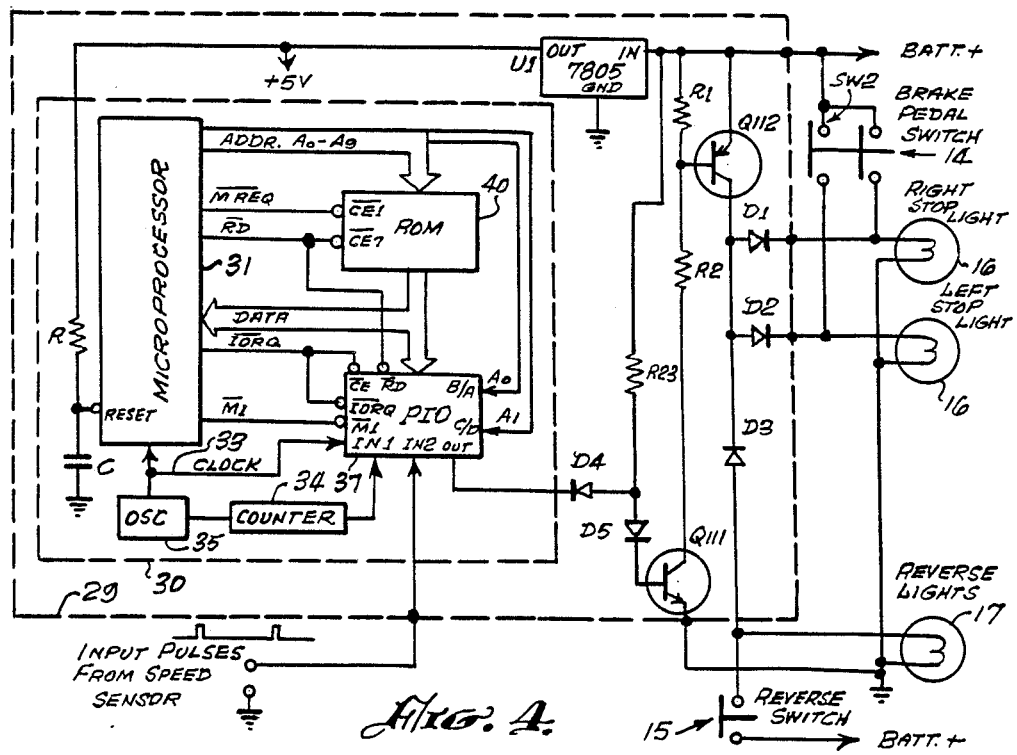
FIG. 4 is a functional block diagram coupled to the output stages of another embodiment of the invention comprising a microprocessor having as its input, a train of digital pulses from a suitable digital transducer.

Referring now to FIG. 4, portions of the circuit enclosed within the outer-dashed lined box comprise one implementation of this invention with its microprocessor control system 29, as applied to the switches 14, SW2, 15 and lamps 16, 17 normally found on a vehicle on which this system is installed. Portions within the inner-dashed lined box comprise a microcomputer 30 consisting of a microprocessor 31 and other integrated circuits providing support functions thereto. The diagram is based on the industry standard Z80 microprocessor family, but could also be implemented with other families of integrated circuits, selected and interconnected in ways well known to the art. For example, a larger computing system may be implemented by a vehicle manufacturer to control functions pertaining to engine, environment, displays, etc., and may incorporate the computing functions indicated in the inner-dashed line box of FIG. 4. It is to be understood therefore that while the following circuit descriptions refer to specific details shown in FIG. 4, other circuits in or out of such a larger computing system and which may differ in detail but which accomplish the same result, may be utilized. The key requirement in the operation of microcomputer 30 is to ascertain whether vehicle speed is above or below a preselected value and to provide an output signal which can be used to illuminate the vehicle stop/brake lights as long as the speed remains below that value. Note that in the electronic circuit illustrated in FIG. 4 that the stop lamps 16 will be lighted by a high level signal applied to diode D4 which is tied to the base circuit of the NPN transistor Q111. A high level here turns Q111 on, driving Q112 on and passing current to stop lamps 16 through diodes D1 and D2. With a low signal applied to D4, Q111 is off, except for leakage currents, and the stop lights are not energized from this circuit.

Speed sensor pulses occur at a rate proportional to vehicle speed and detection of the pre-set speed is effected by counting the number of input pulses received within the pre-set timing interval dtermined by a clock 33 and counter 34. The clock's oscillator 35 typically runs at a frequency above one megahertz and the counter will have a sufficient number of stages to yield an output at convenient intervals. The intervals will probably be in the range of 0.25 second to one second, but will be fixed for a given system. Counter outputs are applied to a PIO (Parallel Input/Output) integrated circuit 37 at the pin labeled INI and speed sensor pulses are applied at the pin labeled IN2. Speed sensor pulses received between successive clock/counter pulses are accumulated internally in a software counter. In the small system of FIG. 4, this will be a register in microprocessor 31, but in a larger system it may be in a RAM (Random Access Memory). The system of FIG. 4 has no RAM. Each time a clock/counter pulse is received, the number of accumulated sensor pulses is copared with (a constant number stored in the program.) If the accumulated count is less than the stored number, a high logic level signal is sent through the PIO output to diode D4, turning on the stop lamps 16. Otherwise, a low level signal is sent to diode D4. In either case, the software counter, is then rest to zero for the next period. The system obviously has a resolution of one count. The clock/counter time interval and the constant number stored in the program must be chosen with respect to the pulse sensor rate (at the selected vehicle speed) in such a way that the accumulated counts for that speed yield an acceptable resolution. For example, 100 accumulated sensor counts per clock/counter pulse yields one percent resolution.

Since proper operation of this system depends on the relative time of occurrence of pulses from two sources, it is imperative that provision be made for the recognition of the pulses when they occur. In general, two methods are in common use. (a) The microprocessor interrogates the PIO 37 often enough to observe all pulses. That is, no pulse could occur between interrogations at the speed of interest. (b) The microprocessor is interrupted from other business each time a pulse occurs. In the small system of FIG. 4, the microprocessor 31 is dedicated to this activity and none other. In this case, the interrogation method would be used for both inputs. In larger systems, it may be best to use an interrupt for either one or both of the two inputs, making four possibilities in all. Each is described below.

Referring to the flow chart of FIG. 5, the system software performs blocks 1 and 2 after power-up only. Block 3 is included for generality since in a small dedicated system there may be not other activities. In that case, block 3 would be deleted. Blocks 4 and 6 represent the input interrogations. The program loops through 4 and 6 (and possibly 3) continuously until an input occurs. For each sensor pulse input, the program increments the software counter by one (block 5) and continues the loop. At each clock/counter input, the accumulated sensor count is compared with a constant number stored in the program. If the count is greater than the stored number, a signal is sent out to turn on the lamps 16 (high logic level to diode D4). Otherwise, that is if the count is equal to or less than the stored number, a signal is sent out to turn off the lamps 16 (low logic level to diode D4).

Referring to the flow chart of FIG. 6, this arrangement can be selected where only one interrupt input is available for system 29 or where it is undesirable to make a large number of futile interrogations of the clock/counter input line. As before, blocks 1 and 2 are executed only at power-up time. The program loops through blocks 3 and 4 until a sensor pulse occurs. It then increments the software counter and returns to the loop. Meanwhile, when a clock/counter pulse occurs, it causes the program execution to be interrupted at the end of its then-current instruction and to branch to the routine shown in the lower part of the FIGURE. Block 6 represents the interrupt itself and blocks 7 through 10 are the same as in FIG. 5. After leaving block 9 or 10, the program returns to the next instruction after the one which was being executed at the time of the interrupt.

Figure 7:
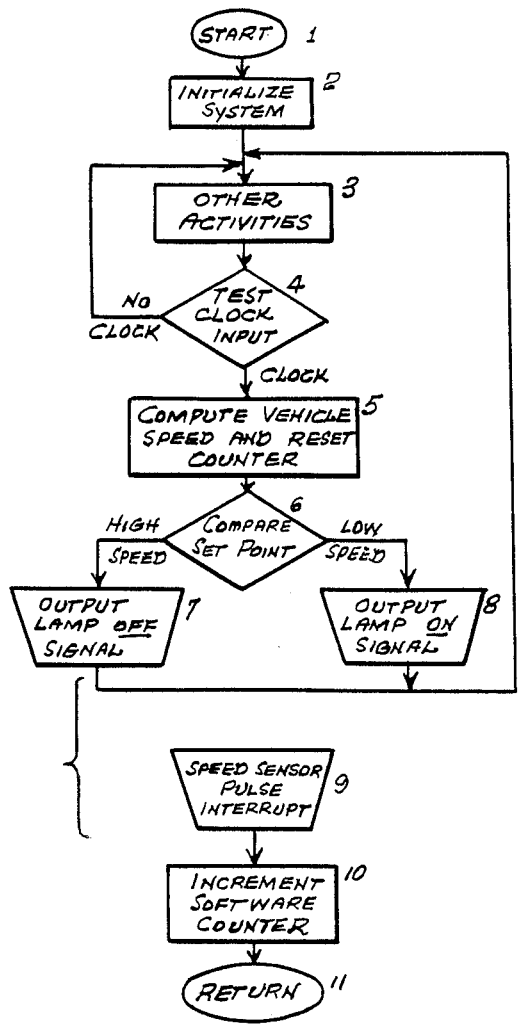
FIG. 7 is still another alternate flow chart for the FIG. 4 system.

Referring to the flow chart of FIG. 7, this can be used in a system executing other activities so that it could not interrogate the speed sensor input often enough to catch all pulses. After power-up initialization in blocks 1 and 2, the program loops through blocks 3 and 4 continuously,—waiting for a clock pulse. Meanwhile, each speed sensor pulse causes an interrupt and the associated service routine increments the software counter and returns. This is indicated ion blocks 9, 10 and 11. After a clock/counter pulse is detected by interrogation in block 4, the program compares the contents of the software and sends the appropriate output signal, as indicated in blocks 5 through 8. This algorithm could suffer some loss of resolution if the clock/counter input is interrogated infrequently, because a small but undetermined number of sensor pulses might occur after the clock/counter pulse, but before interrogation.

Figure 8:
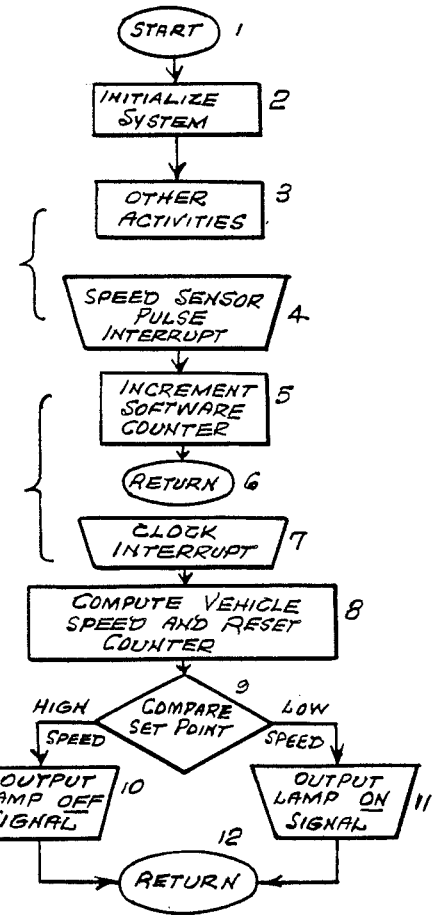
FIG. 8 is a flow chart referencing FIG. 4 and illustrating procedure in the system's software.

Referring to the flow chart of FIG. 8, this algorithm is appropriate for a system which is busy with other activities but has two interrupt lines available. After power-up initialization, the program goes about other activities, making no interrogation of either input line. Blocks 4, 5 and 6 indicate an interrupt service routine which increments the software counter in response to speed sensor pulses, and blocks 7 through 12 indicate another service routine which compares counter contents with a stored number and sends the proper output signal.

System accuracy is desired only at the pre-selected speed, which, as an example is, say, four miles per hour. However, the vehicle may be operated at speeds which are twenty or more times greater, implying a possible hogging of computer time where speed sensor pulses cause interrupts. Actually, this need not be a problem. PIO 37 can be programmed to latch and hold an input until it is read out by microprocessor 31. If another pulse arrives in the meantime, it is lost. This is of no consequence, since the subject matter of the invention is not trying to measure speed. It only determines that it is above a particular value. At high speeds therefore, the result will be satisfactory if enough pulses are captured to indicate high speed, even though all of them are not captured. A similar effect occurs where the speed sensor pulses are detected by interrogation. At high speeds some of the pulses may be lost because they occur between interrogations, with similar results.

To complete the circuit description, module U1, FIG. 4, is an industry standard, type 7805, with fixed three terminal regulator, yielding a nominal output of five volts, as required by microcomputer 30. NPN transistor Q111 (type 2N3904), together with R23, diodes D4 and D5, provide a level shifting interface between the nominal five volt output of PIO 37 and the BATT+ voltage. Diodes D4 and D5 are small signal switching silicon diodes, type 914 or comparable. Microcomputer 30's components are CMOS versions of the Z80 family.

Microprocessor 30 is type Z84C00 and PIO 37 is type Z84C20. Oscillator 35 and counter 34 can be implemented fusing standard 4000 series CMOS logic modules. For oscillator 35, a type 4049 inverting buffer would be a good choice. Counter 34 requires many stages. For example, an 18-stage binary counter will reduce the frequency by a factor of 262,144. If the oscillator frequency is one megahertz, the counter output would be 3.8 hertz, making one clock/counter pulse every 0.262 seconds. Type 4024 is a 7-stage ripple counter and type 4040 is a 12-stage counter. These can be used in tandem, making a 19-stage counter, with numerous taps. The ROM 40 (Read Only Memory) would actually be a PROM (Programmable Read Only Memory) for the system using the separate integrated circuits described here. For a very high volume product, most of the above parts would be incorporated into one large integrated circuit, preferably using CMOS technology.

While a parricular embodiment of a vehicle low speed warning system herein shown and disclosed in detail is fully capable of attaining the objects and others and providing the advantages and others hereinbefore stated, it is to be understood that it is merely illustrative as the presently preferred embodiment of the invention and that no limitations are intended to the details of constructions or designs herein shown other than as defined in the appended claims.

I claim:

1. In a vehicle slow speed warning system having a means for generating a train of signal pulses at a rate proportional to the vehicle's speed, and having a vehicular brake light, the improvement comprising a pulse interval detector comprising:
    a first monostable multivibrator means responsive to each of said signal pulses for generating a corresponding control pulse of a fixed interval;
    means for comparing the fixed interval of each of said control pulses with the period between the leading edges of said signal pulses to generate a first control signal whenever the pulse rate of said signal pulses drops below a pre-set rate determined by said fixed interval;
    means responsive to said first control signal to generate a second control signal; and,
    means responsive to said second control signal to apply operating power to said vehicular brake light.

2. The system of claim 1 wherein said multivibrator means comprises a Schmitt trigger circuit.

3. The system of claim 1 including:
    a second monostable multivibrator operatively connected to said first control signal responsive means so as to generate said second control signal in the event that the pulse rate of said control pulses drops below a given rate.

4. The system of claim 3 wherein said first control means comprises:
    a logical OR gate having two gate inputs and a single gate output, one of said gate inputs being responsive to the output of said first monostable multivibrator and the other of said gate inputs being responsive to the output of said second monostable multivibrator.

5. The system of claim 1 wherein said first control signal responsive means comprises a second monostable multivibrator operatively connected to said first control signal responsive means so as to generate said second control signal in the event that the pulse rate of said control pulses drops below a given rate.

6. In a vehicle slow speed warning system having a means for generating a train of signal pulses at a rate proportional to the vehicle's speed, and having a vehicular brake light, the improvement comprising a pulse interval detector comprising:
    a microcomputer system including
    a microprocessor for comparing the sum of a number of signal pulses in a predetermined time interval with a constant number stored in the microprocessor.
    said microprocessor including means for generating a control signal,
    said control signal responsive to the result of the comparison made by said microprocessor to apply operating power to electronic output stages included in said system for said vehicular brake light.

* * * * *

UNITED STATES PATENT AND TRADEMARK OFFICE
CERTIFICATE OF CORRECTION

PATENT NO. : 4,841,276

DATED : June 20, 1989

INVENTOR(S) : Roy P. Abel et al

It is certified that error appears in the above-identified patent and that said Letters Patent is hereby corrected as shown below:

Column 12, line 37, the period (.) should be a comma --(,)--.

Signed and Sealed this

Thirteenth Day of March, 1990

*Attest:*

JEFFREY M. SAMUELS

*Attesting Officer*      *Acting Commissioner of Patents and Trademarks*